(12) United States Patent
Dykstra et al.

(10) Patent No.: US 10,408,955 B2
(45) Date of Patent: Sep. 10, 2019

(54) FILTERING MICROSEISMIC EVENTS FOR UPDATING AND CALIBRATING A FRACTURE MODEL

(71) Applicant: Halliburton Energy Services, Inc., Houston, TX (US)

(72) Inventors: Jason D. Dykstra, Spring, TX (US); Zhijie Sun, Montgomery, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 99 days.

(21) Appl. No.: 15/519,924

(22) PCT Filed: Nov. 19, 2014

(86) PCT No.: PCT/US2014/066385
§ 371 (c)(1),
(2) Date: Apr. 18, 2017

(87) PCT Pub. No.: WO2016/080980
PCT Pub. Date: May 26, 2016

(65) Prior Publication Data
US 2017/0343689 A1    Nov. 30, 2017

(51) Int. Cl.
*G06G 7/48* (2006.01)
*G01V 1/28* (2006.01)
(Continued)

(52) U.S. Cl.
CPC .............. *G01V 1/282* (2013.01); *E21B 43/26* (2013.01); *E21B 47/12* (2013.01); *G01V 1/288* (2013.01);
(Continued)

(58) Field of Classification Search
None
See application file for complete search history.

(56) References Cited

U.S. PATENT DOCUMENTS

| 2,747,172 | A  | 5/1956  | Bayhi |
| 6,814,160 | B1 | 11/2004 | Scott |

(Continued)

FOREIGN PATENT DOCUMENTS

| CA | 2896497 | 3/2014 |
| CA | 2915625 | 1/2015 |

(Continued)

OTHER PUBLICATIONS

Wright, C.A. et al., "Downhole Tiltmeter Fracture Mapping: Finally Measuring Hydraulic Fracture Dimensions", May 10-13, 1998, SPE Western Regional Conference, Society of Petroleum Engineers, Inc. (Year: 1998).*

(Continued)

*Primary Examiner* — Cedric Johnson
(74) *Attorney, Agent, or Firm* — Kilpatrick Townsend & Stockton LLP

(57) ABSTRACT

A fracture model for a hydraulic fracture in a wellbore can be updated and calibrated. Information about a microseismic event can be received from a sensor that is monitoring a subterranean formation. The information can be received subsequent to a fracking fluid being introduced into the formation. An observed geometry of a hydraulic fracture can be determined based on the information and a predicted geometry of the fracture can be determined based on properties of the fracking fluid and a fracture model. The fracture model can be updated using the information about the microseismic event where it is determined that an uncertainty value of the observed geometry does not exceed a pre-set maximum. The uncertainty value can be based on the predicted geometry of the hydraulic fracture.

17 Claims, 5 Drawing Sheets

(51) Int. Cl.
*E21B 43/26* (2006.01)
*E21B 47/12* (2012.01)
*G01V 1/50* (2006.01)

(52) U.S. Cl.
CPC ............... *G01V 1/50* (2013.01); *G06G 7/48* (2013.01); *G01V 2210/646* (2013.01)

(56) References Cited

U.S. PATENT DOCUMENTS

| | | | |
|---|---|---|---|
| 10,338,247 B2 | 7/2019 | Dykstra et al. | |
| 2003/0050758 A1 | 3/2003 | Soliman et al. | |
| 2007/0079652 A1* | 4/2007 | Craig | E21B 49/008 73/152.22 |
| 2008/0004847 A1* | 1/2008 | Bradford | G01V 1/30 703/10 |
| 2008/0149329 A1 | 6/2008 | Cooper et al. | |
| 2008/0164021 A1* | 7/2008 | Dykstra | E21B 43/267 166/250.1 |
| 2009/0059721 A1 | 3/2009 | Simon et al. | |
| 2009/0166029 A1 | 7/2009 | Maksimenko et al. | |
| 2009/0315539 A1 | 12/2009 | Helwig et al. | |
| 2009/0316524 A1 | 12/2009 | Tenghamn et al. | |
| 2010/0252268 A1 | 10/2010 | Gu et al. | |
| 2010/0262373 A1 | 10/2010 | Khadhraoui et al. | |
| 2010/0307755 A1 | 12/2010 | Xu et al. | |
| 2011/0120702 A1 | 5/2011 | Craig et al. | |
| 2011/0120706 A1 | 5/2011 | Craig | |
| 2012/0300582 A1 | 11/2012 | Winter et al. | |
| 2013/0079935 A1* | 3/2013 | Kabannik | E21B 43/26 700/282 |
| 2013/0081805 A1 | 4/2013 | Bradford et al. | |
| 2013/0090902 A1 | 4/2013 | Yao et al. | |
| 2013/0238304 A1* | 9/2013 | Glinsky | G06F 17/5009 703/6 |
| 2014/0100786 A1* | 4/2014 | Ma | G01V 1/288 702/16 |
| 2014/0372089 A1* | 12/2014 | Weng | E21B 43/26 703/2 |
| 2015/0066458 A1 | 3/2015 | Coles et al. | |

FOREIGN PATENT DOCUMENTS

| | | |
|---|---|---|
| WO | 2014105659 | 7/2014 |
| WO | 2016080981 | 5/2016 |
| WO | 2016105351 | 6/2016 |

OTHER PUBLICATIONS

Swanson, P. L. et al., "Accuracy and Precision of Microseismic Event Locations in Rock Burst Research Studies", 1992, Report of Investigations, United States Department of the Interior. (Year: 1992).*

Canadian Application No. 2,964,862, Office Action dated May 7, 2018, 4 pages.

International Patent Application No. PCT/US2014/066385, "International Search Report and Written Opinion", dated Aug. 3, 2015, 12 pages.

Canadian Patent Application No. 2,964,862, Office Action dated Dec. 27, 2018, 5 pages.

Swanson et al., "Accuracy and Precision of Microseismic Event Locations in Rock Burst Research Studies", United States Department of Interior, 1992, 46 pages.

* cited by examiner

FILTERING MICROSEISMIC EVENTS FOR UPDATING AND CALIBRATING A FRACTURE MODEL

CROSS-REFERENCE TO RELATED APPLICATIONS

This is a U.S. national phase under 35 U.S.C. 371 of International Patent Application No. PCT/US2014/066385 titled "Filtering Microseismic Events For Updating and Calibrating A Fracture Model" and filed Nov. 19, 2014, the entirety of which is incorporated herein by reference.

TECHNICAL FIELD

The present disclosure relates generally to systems and methods for analyzing a subterranean formation. More specifically, but not by way of limitation, this disclosure relates to improved hydraulic fracture modeling.

BACKGROUND

A well system (e.g., oil or gas wells for extracting fluids from a subterranean formation) can include a wellbore drilled into a formation. Hydraulic fracturing operations can be performed on the wellbore to increase production by pumping a hydraulic fluid down the cased wellbore into the formation at pressures and injection rates sufficient to cause the formation rock to initiate and propagate a hydraulic fracture (or induced fracture) into the subterranean formation. Accurate estimation of the geometry of the hydraulic fracture can improve production economics by increasing reservoir productivity and reducing completion costs.

DETAILED DESCRIPTION

Figure 1:
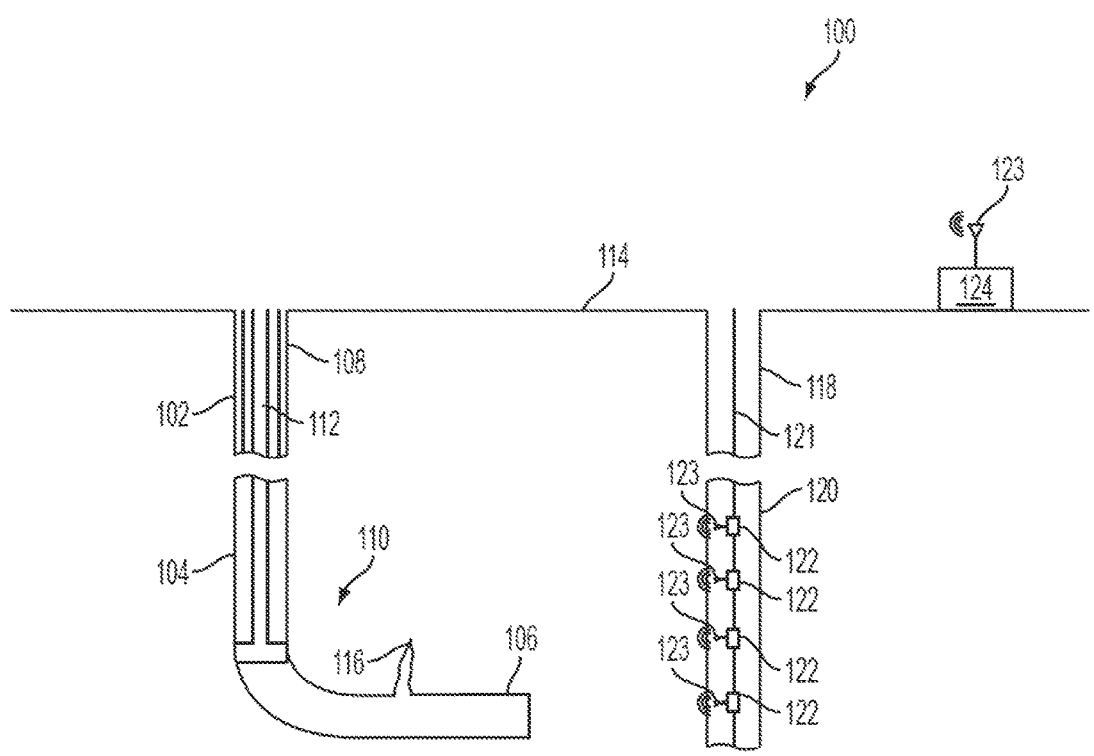
FIG. 1 is a schematic illustration of an active wellbore and a microseismic monitoring system according to one aspect of the present disclosure.

Certain aspects and examples of the disclosure are directed to using data acquired from sensors, for example geophones or tiltmeters, to generate and filter a data set used to update, and in some aspects calibrate, a fracture model. A well updated and calibrated fracture model can provide an accurate estimation of the geometry of a hydraulic fracture. Accurate estimation of the geometry of the hydraulic fracture can improve production economics by increasing reservoir productivity and reducing completion costs.

Hydraulic fracturing operations can cause microseismic events to occur in the subterranean formation. Microseismic events in subterranean formations are shear events that are slippages along hydraulic fractures as well as natural fractures, bedding, faults, dewatering features, and other planes of weakness. During a hydraulic fracturing operation, the formation stress and the pore pressure in the formation surrounding a hydraulic fracture are increased. Both the pore pressure increase and formation can cause microseismic events to occur in the subterranean formation proximate to the tip of a hydraulic fracture. A computing device can receive data from the sensors that monitor these microseismic events and can calculate the location of the microseismic event using the data and additional information about the formation. The computing device can use the location of the microseismic event to determine an observed length of the hydraulic fracture. For example, in a bi-wing fracture the length of the fracture is the distance from the main wellbore to the tip where the microseismic event is assumed to have occurred. The computing device can use information about the hydraulic fracturing operation and a fracture model to predict the geometry of the hydraulic fracture, for example the length of the hydraulic fracture. The fracture model can be updated with observed measurements to stop error accumulation by updating the state vector. In some aspects, the fracture model can be calibrated when necessary to update additional vectors of the fracture model. The computing device can use the observed length of the hydraulic fracture to update the fracture model and in some aspects calibrate the fracture model.

Hydraulic fracturing can also cause microseismic events in the subterranean formation at locations other than the tip of the hydraulic fracture. For example, microseismic events can occur at a natural fracture. When the location of the microseismic event monitored by the sensors is not at the tip of the hydraulic fracture the observed length, or other geometry of the hydraulic fracture determined by the computing device, can be inaccurate. When the computing device uses an observed length associated with a microseismic event that did not occur at the tip of the hydraulic fracture to update the fracture model it can decrease the accuracy of the fracture model.

The computing device can increase the accuracy of the fracture model by calibrating the fracture model using observed lengths of the hydraulic fracture that correspond to microseismic events that occur near the tip of the fracture. The computing device can determine if the microseismic event occurred near the tip of the fracture by comparing an uncertainty value of the observed length to a maximum uncertainty value. The uncertainty value of the observed length can be determined by comparing the observed length to a predicted length of the hydraulic fracture based on the fracture model.

FIG. 1 is a schematic illustration of a microseismic monitoring system 100 according to one aspect. An active wellbore 102 extends through various earth strata. The active wellbore has a substantially vertical section 104 and a substantially horizontal section 106. The substantially vertical section 104 may include a casing string 108 cemented at an upper portion of the substantially vertical section 104. The substantially horizontal section 106 extends through a hydrocarbon bearing subterranean formation 110. A tubing string 112 extends from the surface 114 into the active wellbore 102. The tubing string 112 can provide a conduit for pumping a fracking fluid into the active wellbore 102 to perform hydraulic fracking operations on the active wellbore 102. The active wellbore 102 includes a hydraulic fracture 116 (or induced fracture) that extends from the substantially horizontal section 106. Proppant materials can be entrained in the fracturing fluid and deposited in the hydraulic fracture 116 to keep the hydraulic fracture 116 open.

The system 100 can include an observation wellbore 118 extending through various earth strata. The observation wellbore 118 has a substantially vertical section 120. Multiple geophones 122 are positioned on a tool 121 deployed within the observation wellbore 118. In some aspects, transducers, tiltmeters or other suitable sensors may be used in place of the geophones 122. The geophones 122 can monitor microseismic events in the formation 110. For example, the geophones 122 can detect the arrival of the Primary (P) waves and the Secondary (S) waves of a microseismic event in the formation 110 during a hydraulic fracturing operation. In some aspects, tiltmeters may be positioned at the surface 114 proximate the horizontal location of the hydraulic fracture 116 or in shallow holes at the surface 114. The surface tiltmeters can be communicatively coupled to the computing device 124 and can transmit data sufficient to determine a location of a microseismic event in the formation 110.

The geophones 122 can be communicatively coupled to a computing device 124. The computing device 124 can be positioned at the surface 114 or at a separate location. The computing device 124 can include a processor interfaced with other hardware via a bus. A memory, which can include any suitable tangible (and non-transitory) computer-readable medium, such as random-access memory ("RAM"), ROM, electrically erasable and programmable read-only memory ("EEPROM"), or the like, can embody program components that configure operation of the computing device 124. In some aspects, the computing device 124 can include input/output interface components (e.g., a display, keyboard, touch-sensitive surface, and mouse) and additional storage. The computing device 124 can transmit data to and receive data from the geophones 122 via a communication link 123. The communication link 123 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In other aspects, the communication link 123 can be wired and can include interfaces such as Ethernet, USB, IEEE 1394, or a fiber optic interface. An example of the computing device 124 is described in further detail with respect to FIG. 3.

The computing device 124 can use the data received from the array of geophones 122 to determine the location of a microseismic event that occurs in the formation 110 during a fracking operation. For example, the computing device 124 can receive from geophones 122 raw signal data corresponding to the arrival times of the P-waves and S-waves associated with the microseismic event. The computing device 124 can calculate the difference between the travel times of the P-waves and S-waves using data associated with the formation 110 to determine a location of the microseismic event. The computing device 124 can determine an observed length of the hydraulic fracture 116 based on the location of the microseismic event and the assumption that the event occurred at the tip of the hydraulic fracture.

The computing device 124 can also determine an estimated or a predicted length of the hydraulic fracture 116 (hereinafter "predicted length") based on a fracture model. For example, a bi-wing fracture can be characterized by the Perkins-Kern-Nordgren (PKN) model. In some aspects, the computing device can determine an estimated or predicted width or other geometry of the hydraulic fracture 116. The computing device 124 can also determine an uncertainty value of the observed length of the hydraulic fracture 116 that was calculated using the data received from the geophones 122. The uncertainty value of the observed length of the hydraulic fracture 116 can be the difference between the observed length and the predicted length (the length predicted by the model) of the hydraulic fracture 116.

The computing device 124 can determine whether the uncertainty value of the observed length of the hydraulic fracture is less than or equal to a maximum uncertainty value. The maximum uncertainty value can be an uncertainty region corresponding to the location of the tip of the hydraulic fracture and can be based on an uncertainty of the predicted length of the hydraulic fracture 116. The computing device 124 can determine the uncertainty of the predicted length of the hydraulic fracture 116 based on the model. For example, the uncertainty of the predicted length can be determined as $\Sigma_L = C_k P(k) C_k^T + V_k$. If 95% certainty that the microseismic event measured occurred at or near the fracture tip is desired, then the maximum uncertainty value may be $2\Sigma_L$. If a 99% certainty is desired, then the maximum uncertainty value may be $3\Sigma_L$. The computing device 124 can receive the maximum uncertainty value from an input by a user.

An observed length of the hydraulic fracture 116 that has an uncertainty value that exceeds maximum uncertainty value may be considered to be an inaccurate measurement of the length of the hydraulic fracture 116. An observed length of the hydraulic fracture 116 that has an uncertainty value that does not exceed the maximum uncertainty value can be considered to be an accurate measurement of the length of the hydraulic fracture 116 and can be used to update the model.

In some aspects, the computing device 124 can store all the observed lengths of the hydraulic fracture 116, regardless of their uncertainty value, in a data store. In some aspects, the computing device 124 can store only the observed lengths of the hydraulic fracture 116 having an uncertainty value that does not exceed the maximum uncertainty value in the data store.

The observed lengths of the hydraulic fracture 116 can also include a classification that indicates whether the observed length is associated with an uncertainty value that exceeds or does not exceed the maximum uncertainty value. An observed length of the hydraulic fracture 116 having an uncertainty value that exceeds the maximum uncertainty value can be considered to be a length measurement calculated from microseismic event far from the tip of the hydraulic fracture. An observed fracture length of the hydraulic fracture 116 having an uncertainty value that does not exceed the maximum uncertainty value can be considered to be a length measurement calculated from a microseismic event near the tip of the hydraulic fracture 116.

If the data store includes more observed lengths of the hydraulic fracture 116 associated with an uncertainty value that exceeds the maximum uncertainty value then calibration or adaptation of the fracture model may be needed. The computing device 124 can calibrate the fracture model by running a clustering algorithm on the observed lengths in the data store and determining a cluster of observed lengths that has the greatest possibility of representing the fracture growth. The computing device 124 can re-estimate or calibrate the fracture model using the cluster of observed lengths determined to have the greatest possibility of representing the fracture growth.

Figure 2:
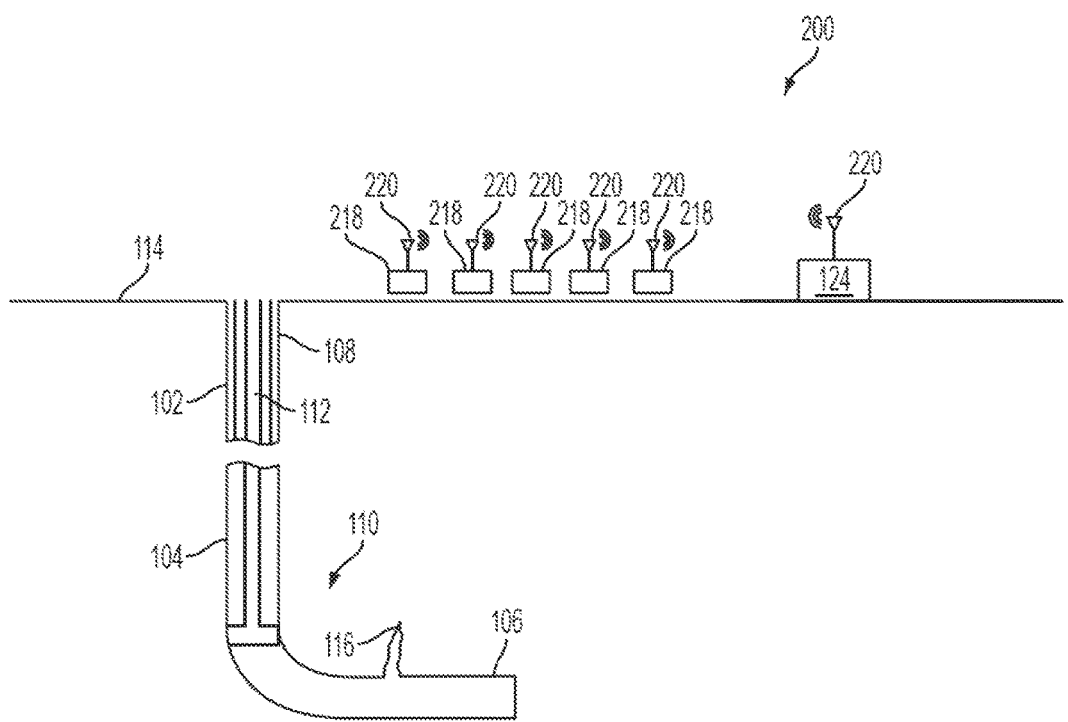
FIG. 2 is a schematic illustration of an active wellbore and a microseismic monitoring system according to one aspect of the present disclosure.

FIG. 2 is a schematic illustration of a microseismic monitoring system 200 according to one aspect. The wellbore 102 extends through various earth strata and has a substantially vertical section 104 and a substantially horizontal section 106. The substantially vertical section 104 has the casing string 108 cemented at an upper portion of the substantially vertical section 104. The substantially horizontal section 106 extends through the hydrocarbon bearing subterranean formation 110. Tubing string 112 extends from the surface 114 into the wellbore 102 and can provide a conduit for pumping a fracking fluid into the wellbore 202 to perform hydraulic fracking operations on the wellbore 102. The hydraulic fracture 116 extends from the substantially horizontal section 106. Proppant materials can be entrained in the fracturing fluid and deposited in the hydraulic fracture 116 to keep the hydraulic fracture 116 open.

The system 200 includes multiple tiltmeters 218 positioned at the surface 114. In some aspects, each of the tiltmeters 218 can be positioned in a shallow hole at the surface 114 proximate the lateral location of the hydraulic fracture 116. The tiltmeters 218 can monitor microseismic events in the formation 110. For example, the tiltmeters 218 can measure hydraulic fracture-induced deformations or microdeformations at the surface 114 using orthogonal tilt sensors. In some aspects, the tiltmeters 218 may be measure microdeformations in the subterranean formation when positioned downhole in an observation wellbore.

The tiltmeters 218 are communicatively coupled to the computing device 124 via a wireless communication link 220. In some aspects, the communication link 220 can be wired. The computing device 124 can transmit data to and receive data from the tiltmeters 218 via the communication link 220. An example of the computing device 124 is described in further detail with respect to FIG. 3.

The computing device 124 can receive data from the tiltmeters 218 related to a microseismic event in the formation 210 during a hydraulic fracturing operation. For example, the computing device 124 can receive measurements of hydraulic fracture-induced deformations or microdeformations at the surface 214. The computing device 124 can use the data received from the tiltmeters 218 to determine a length of a hydraulic fracture. For example, the length of a vertical hydraulic fracture can be determined by calculating the relative distance on the horizontal plane between the microseismic event locations and perforations at a wellbore.

As described with respect to the system 100 of FIG. 1, the computing device 124 can also determine a predicted length of the hydraulic fracture 116 based on a fracture growth model, for example, by using the PKN model where the hydraulic fracture 116 is a bi-wing fracture. The computing device 124 can determine an uncertainty value of the observed length of the hydraulic fracture 116 that was calculated using the data received from the tiltmeters 218. The uncertainty value of the observed length of the hydraulic fracture 116 can be the difference between the observed length and the predicted length (the length predicted by the model) of the hydraulic fracture 116.

The computing device 124 can determine an uncertainty value of the predicted length of the hydraulic fracture 116 is: $\Sigma_L = C_k P(k) C_k^T + V_k$. The computing device 124 can receive an input from a user that is a maximum uncertainty value based on the uncertainty of the predicted length of the hydraulic fracture 116. For example, if 95% certainty that the microseismic event measured occurred at or near the fracture tip, then the maximum uncertainty value can be $2\Sigma_L$. If a 99% certainty is desired, the maximum uncertainty value can be $3\Sigma_L$.

The computing device 124 can determine whether the uncertainty value of the observed length of the hydraulic fracture 116 is less than or equal to the maximum uncertainty value. An observed length of the hydraulic fracture 116 that has an uncertainty value that is less than or equal to the maximum uncertainty value can be used to update the fracture model. In some aspects, the computing device 124 can store all the observed lengths of the hydraulic fracture 116 in a data store. In some aspects, the computing device 124 can store only the observed lengths of the hydraulic fracture 116 having an uncertainty value that does not exceed the maximum uncertainty value in the data store.

An observed length of the hydraulic fracture 116 that has an uncertainty value that is greater than the maximum uncertainty value may be considered an inaccurate calculation of the length of the hydraulic fracture 116 and may not be used to update the model. The computing device 124 can increase the accuracy of the fracture model by calibrating the fracture model with the observed lengths of the hydraulic fracture 116 that have an uncertainty value that does not exceed the maximum uncertainty value.

Figure 3:
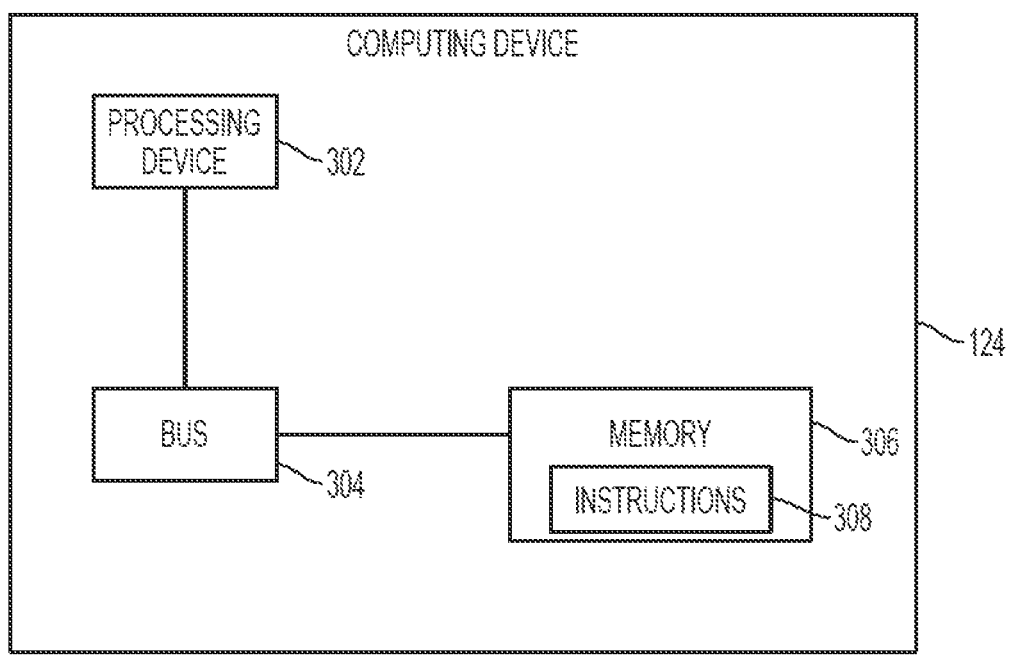
FIG. 3 is a is a block diagram depicting an example of a computing device for updating and calibrating a fracture model using microseismic event data according to one aspect of the present disclosure.

FIG. 3 is a block diagram depicting an example of a computing device 124 for determining an observed length of a hydraulic fracture and calibrating the fracture model according to one aspect of the present disclosure. The computing device 124 includes a processing device 302, a memory device 306, and a bus 304.

The processing device 302 can execute one or more operations for calibrating a fracture model. The processing device 302 can execute instructions 308 stored in the memory device 306 to perform the operations. The processing device 302 can include one processing device or multiple processing devices. Non-limiting examples of the processing device 302 include a Field-Programmable Gate Array ("FPGA"), an application-specific integrated circuit ("ASIC"), a microprocessor, etc.

The processing device 302 can be communicatively coupled to the memory device 306 via the bus 304. The non-volatile memory device 306 may include any type of memory device that retains stored information when powered off. Non-limiting examples of the memory device 306 include EEPROM, flash memory, or any other type of non-volatile memory. In some aspects, at least some of the memory device 306 can include a medium from which the processing device 302 can read the instructions 308. A computer-readable medium can include electronic, optical, magnetic, or other storage devices capable of providing the processing device 302 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions may include processor-specific instructions generated by a compiler or an interpreter from code written in any suitable computer-programming language, including, for example, C, C++, C#, etc.

Figure 4:
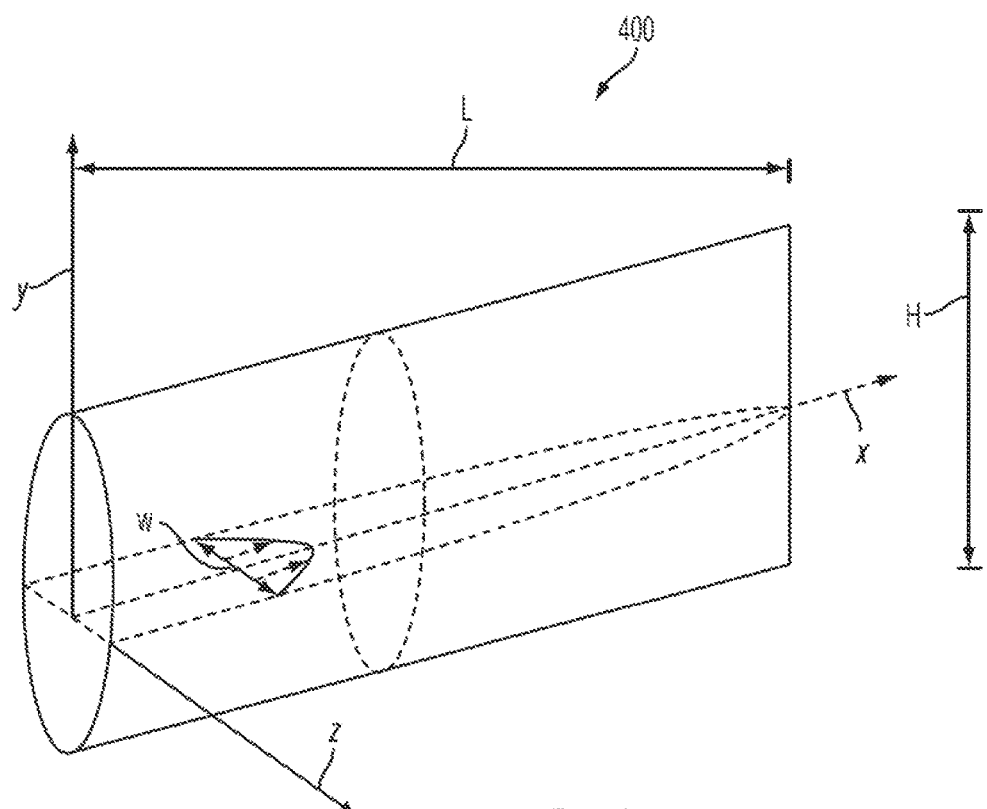
FIG. 4 is an illustration of the Perkins-Kern-Nordgren model of a fracture according to one aspect of the present disclosure.

FIG. 4 is an illustration of the PKN model 400 of a bi-wing hydraulic fracture where the fracture height H is fixed along the y-axis. The computing device 124 can use the PKN model to estimate a hydraulic fracture length L along the x-axis. The width W of the PKN model of the hydraulic fracture is depicted along the z-axis. In some aspects, the computing device 124 can use a different fracture model to predict the geometry of a different type of hydraulic fracture. For example, the Kristonovich-Geertsma-Daneshy (KGD) model or a discrete fracture network model can be used in some aspects. The computing device 124 can receive additional data to determine the predicted geometry of the hydraulic fracture when using some fracture models. For example, the computing device 124 may receive a proppant concentration value from an input by a user for use in predicting the geometry of the hydraulic fracture using a fracture model.

Figure 5:
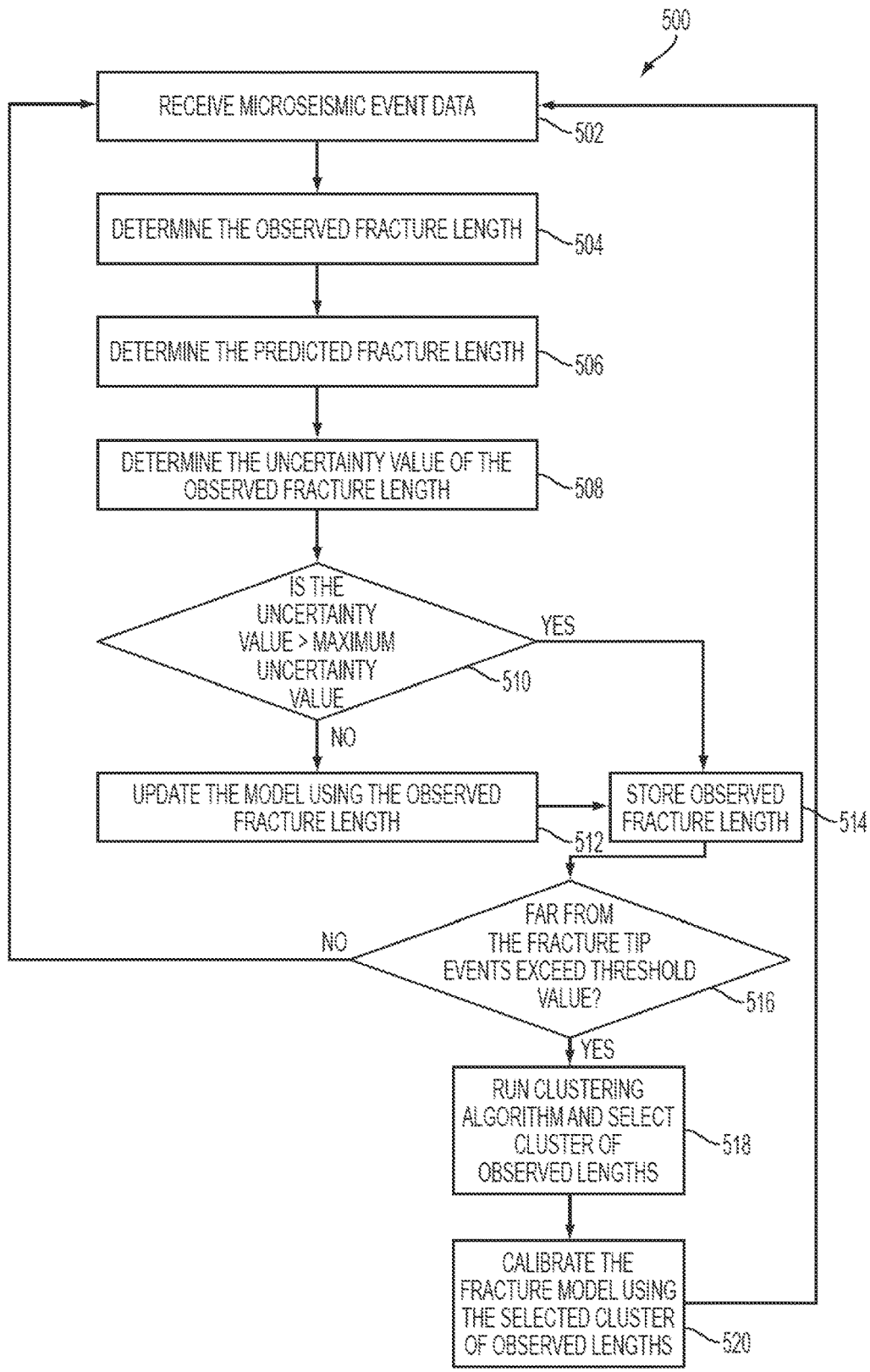
FIG. 5 is an example of a flow chart for a process of updating and calibrating a fracture model using microseismic event data according to one aspect of the present disclosure.

FIG. 5 is an example of a flow chart of a process 500 calibrating a fracture model using microseismic event data according to one aspect of the present disclosure. The process 500 below is described with reference to components described above with regard to the computing device 124 shown in FIG. 3. At block 502 the computing device receives microseismic event data from an array of geophones during a hydraulic fracturing operation. In some aspects, the computing device may receive the microseismic event data from other suitable sensors used to monitor microseismic events in a formation during a hydraulic fracture operation, for example tiltmeters.

At block 504 the computing device determines an observed length of the hydraulic fracture using the microseismic event data received from the geophones. For example, the computing device can determine the location of the microseismic event by calculating the difference between the travel times of the P-waves and S-waves of the microseismic event using additional information about the formation. The additional information can include, for example, the number of rock layers in the formation, the velocity of the P-waves and S-waves through each of the rock layers, and the height of each of the rock layers in the formation.

At block 506 the computing device determines a predicted length of the hydraulic fracture using a fracture model. For example, the PKN model can be used to determine a predicted fracture length of a bi-wing hydraulic fracture. The computing device can use inputs including the injection rate of the fracking fluid and the viscosity of the fracking fluid to determine the predicted length of the hydraulic fracture based on the fracture model. For example, a bi-wing fracture can be characterized by the Perkins-Kern-Nordgren (PKN) model:

$$\frac{\partial w(x,t)}{\partial t} + \frac{\partial q(x,t)}{\partial x} + u_l(x,t) = 0$$

$$q(0,t) = q_0(t)$$

Where w(x,t) is the width of the fracture, q(x,t) is the unit-height injection rate, and $u_l$(x,t) is the unit-height, unit-length, leak-off rate of the fracturing fluid. The injection rate of the fracking fluid at a time t is $q_o$(t) and can be received by the computing device 124 from a user input. The computing device 124 can use Carter's Theory to determine the leak-off rate $u_l$(x,t), which in the PKN model can be expressed as:

$$u_l(x,t) = \frac{2C_l}{\sqrt{t-\tau(x)}}$$

Where τ(x) is a function of fracture arrival time (i.e., the time location x is first exposed to fluid) and $C_l$ is the leak-off coefficient.

The computing device 124 can determine the predicted width of the hydraulic fracture in the PKN model by the pressure profile:

$$\frac{\partial p}{\partial x} = -\frac{2Kq|q|^{n-1}}{\psi^n w^{2n+1}} \quad w = M_c p$$

Where p is the net pressure, n is the flow behavior index of power-law fluid, and ψ is the shape factor of the fracture, and $M_c$ is the fracture compliance. The fracture compliance $M_c$ can be determined by known rock mechanics. In some aspects, where n=1 the fluid is Newtonian and the term K becomes the viscosity of the fluid. The computing device can receive the viscosity of the fracking fluid from an input by a user.

The computing device can determine the predicted length of the hydraulic fracture based on the fracture model using the following global material balance equation:

$$\int_0^{L(t)} w(x,t)dx + \int_0^t \int_0^{L(t_1)} u_L(x,t_1)dxdt_1 = \int_0^t q_0(t_1)dt_1$$

The computing device can derive a dynamic fracture model by combining the above equations and using the injection rate $q_o$ and K. The dynamic fracture model can describe the relationship between $q_o$ and K and the predicted length of the hydraulic fracture as the following linear discrete-time-state-space form:

$$x(k+1)=A_k x(k)+B_k u(k)$$

$$L(k)=C_k x(k)$$

This model can be rewritten with a Kalman filter as:

$$\hat{x}(k+1)=A_k \hat{x}(k)+B_k u(k)+J_k(y(k)-\hat{L}(k))$$

$$\hat{L}(k)=C_k \hat{x}(k)$$

Where u(k) is an input vector that stacks the known input variables together, for example, the injection rate and the fracking fluid viscosity. Specifically u(k)=[$q_o$(k) K(k)]$^T$. The $\hat{x}$(k) is the estimate of the state vector because the state vector x(k) cannot be measured directly. The $\hat{L}$(k) is the predicted length of the hydraulic fracture at a time k given the information known about the hydraulic fracture and hydraulic fracturing operations, for example, the injection rate, viscosity of the fracking fluid, and previous observed lengths of the hydraulic fracture up to a time instant k−1. The y(k) is the observed length of the hydraulic fracture at the time instant k as determined by the computing device using the data received from the sensors monitoring the microseismic event.

The vector $J_k$ is the Kalman gain and adjusts how much prediction error the computing device uses to correct the fracture model. Specifically, the prediction error is a function of y(k)−$\hat{L}$(k). In an aspect where the mechanical properties of the fracture are known perfectly, then the only errors present in the fracture model would be from the microseismic monitoring and $J_k$ should be zero to prevent the microseismic measurement errors from be used to update the fracture model. In an aspect where the rock mechanics of the formation are not well known or the fracture propagation is random, Jk should be a large value since the microseismic results are a source of less error than the fracturing process itself. The value of $J_k$ is given by the following Riccati Equation:

$$P(k+1)=A[P(k)-P(k)C_k^T(C_k P(k)C_k^T+V_k)^{-1}C_k P(k)]A_k^T+W_k$$

$$J_k=A_k P(k)C_k^T(C_k P(k)C_k^T+V_k)^{-1}$$

Where $W_k$ is the covariance matrix of process noise at a time k (i.e., an estimate of randomness and model errors of the fracturing process) and $V_k$ is the covariance matrix of error of the microseismic event location calculated by the microseismic monitoring at time k.

At block 508 the computing device can determine an uncertainty value of the observed length of the hydraulic fracture. The computing device can determine the uncertainty value of the observed length of the hydraulic fracture by comparing the observed length to the predicted length: $y(k)-\hat{L}(k)$. In some aspects, the uncertainty value can be a lateral error of the observed length of the hydraulic fracture (or observed microseismic event location) compared to the predicted length of the hydraulic fracture.

At block 510 the computing device can determine if the uncertainty value is greater than a maximum uncertainty value. The maximum uncertainty value can be based on an uncertainty of the predicted length of the hydraulic fracture. For example, the computing device can determine the uncertainty of the predicted length of the hydraulic fracturing using the Riccati Equation: $\Sigma_L = C_k P(k) C_k^T + V_k$. For example, if 95% certainty that the microseismic event measured occurred at or near the fracture tip, then the maximum uncertainty value may be $2\Sigma_L$. If a 99% certainty is desired, then the maximum uncertainty value may be $3\Sigma_L$. The computing device can receive the maximum uncertainty value from an input by a user.

The computing device can classify the observed lengths of the hydraulic fracture having an uncertainty value that exceeds the maximum uncertainty value as being associated with a microseismic event that occurred far from the tip of the hydraulic fracture. The computing device can also classify observed lengths have an uncertainty value that does not exceed the maximum uncertainty value as being associated with a microseismic event that occurred near the tip of the hydraulic fracture.

If at block 510 the computing device determines that the uncertainty value of the observed length of the hydraulic fracture does not exceed the maximum uncertainty value then at block 512 the computing device can update the fracture model using the observed length of the hydraulic fracture. In some aspects, the computing device can update the fracture model using the microseismic event data, from which the observed length of the hydraulic fracture can be inferred.

At block 514 the computing device can store the observed length of the hydraulic fracture, or in some aspects other data associated with the microseismic event, in a data store. The computing device can store the observed length of the hydraulic fracture with a classification indicating the observed length corresponds to an event near the fracture tip.

In response to determining the uncertainty value of the observed fracture length exceeds the maximum uncertainty value at block 510 the computing device can store the observed length of the hydraulic fracture in the data store at block 514 and can include a classification indicating the observed length corresponds to a microseismic event that occurred far from the fracture tip.

At block 516 the computing device determines if the number of observed lengths of the hydraulic fracture stored in the data store corresponding to a microseismic event that occurred far from the fracture tip exceeds a threshold number. The computing device can receive the threshold number from an input by a user. The threshold number can be in relation to the total number of observed lengths stored in the data store.

If at block 516 the computing device determines the number of stored observed lengths of the hydraulic fracture in the data store that correspond to a microseismic event far from the fracture tip exceeds the threshold value, then at block 518 the computing device can calibrate the fracture model by running a clustering algorithm on the observed lengths in the data store and determining a cluster of observed lengths that has the greatest possibility of representing the fracture growth. For example, the computing device can select the cluster of observed lengths that depict an increase in the fracture length over a period of time. The computing device can at block 520 calibrate the fracture model using the cluster of observed lengths determined to have the greatest possibility of representing the fracture growth. The calibrated Kalman filter of the model will have new A, B, and C, matrices $$\hat{x}(k+1) = A_k \hat{x}(k) + B_k u(k) + J_k(y(k) - \hat{L}(k))$$

$$\hat{L}(k) = C_k \hat{x}(k)$$

The computing device returns to block 502 after re-estimating the fracture model at block 520.

In some aspects, the computing device can instead determine an observed height or other geometry of the hydraulic fracture using the microseismic event data and update the fracture model with the observed geometry. For example, when a hydraulic fracture that only grows in a height direction. The computing device can then also determine a predicted or estimated height or other geometry of the hydraulic fracture using the fracture model.

In some aspects, a fracture model for a hydraulic fracture in a wellbore can be updated and calibrated. Information about a microseismic event can be received from sensors that are monitoring a subterranean formation. The information can be received subsequent to a fracking fluid being introduced into the formation. An observed geometry of a hydraulic fracture can be determined based on the information and a predicted geometry of the fracture can be determined based on properties of the fracking fluid and a fracture model. The fracture model can be updated using the information where it is determined that an uncertainty value of the observed geometry does not exceed a pre-set maximum. The uncertainty value can be based on the predicted geometry of the hydraulic fracture.

In some aspects, a system can include a computing device that has a non-transitory computer-readable medium that has code executable for causing the computing device to receive information about a microseismic event in a subterranean formation from a plurality of sensors that is monitoring the formation. The computing device can receive the information subsequent to a fracking fluid being introduced into the formation. The code can also be executable for causing the computing device to determine an observed geometry of a hydraulic fracture based on the information and can predict the geometry of the fracture, using a fracture model, based on properties of the fracking fluid. The code can also be executable for causing the computing device to determine an uncertainty value of the observed geometry based on the predicted geometry and can update the fracture model using the information when the uncertainty value is less than or equal to a pre-set maximum.

In some aspects, a system can include a plurality of sensors and a computing device. The plurality of sensors can transmit information about a microseismic event in a subterranean formation, the information can be transmitted subsequent to a fracking fluid being introduced into the formation. The computing device determine an observed geometry of a hydraulic fracture based on the information and can predict the geometry of the fracture, using a fracture model, based on properties of the fracking fluid. The computing device can also determine an uncertainty value of the observed geometry based on the predicted geometry and can update the fracture model using the information when the uncertainty value is less than or equal to a pre-set maximum.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method, comprising:
   receiving, by a computing device, information about a microseismic event in a subterranean formation from at least one sensor that is monitoring the subterranean formation, the information about the microseismic event being received subsequent to a fracking fluid being introduced into the subterranean formation;
   determining, by the computing device, an observed geometry of a hydraulic fracture based on the information about the microseismic event;
   determining, by the computing device, a predicted geometry of the hydraulic fracture based on properties of the fracking fluid using a fracture model;
   determining, by the computing device, an uncertainty value of the observed geometry based on the predicted geometry;
   updating, by the computing device, the fracture model using the information about the microseismic event in response to determining that the uncertainty value associated with the observed geometry is less than or equal to a pre-set maximum; and
   storing, by the computing device, the observed geometry and a classification of the observed geometry in a data store, the classification indicating if the uncertainty value associated with the observed geometry exceeds a pre-set maximum;
   determining, by the computing device, a cluster of observed geometries that represent a growth of the hydraulic fracture; and
   calibrating, by the computing device, the fracture model using the cluster of observed geometries.

2. The method of claim 1, further comprising:
   generating, by the computing device, a visual representation of the hydraulic fracture based on the fracture model.

3. The method of claim 1, wherein the fracture model is the Perkins-Kern-Nordgren model.

4. The method of claim 1, wherein the observed geometry is an observed length of the hydraulic fracture and the predicted geometry is a predicted length of the hydraulic fracture.

5. The method of claim 1, wherein the at least one sensor is positionable within a wellbore.

6. The method of claim 1, wherein the properties of the fracking fluid include at least one of an injection rate of the fracking fluid and a viscosity of the fracking fluid.

7. A system comprising:
   a computing device having a non-transitory computer-readable medium on which is code that is executable for causing the computing device to:
      receive information about a microseismic event in a subterranean formation from at least one sensor that is monitoring the subterranean formation, the information about the microseismic event being received subsequent to a fracking fluid being introduced into the subterranean formation;
      determine an observed geometry of a hydraulic fracture based on the information about the microseismic event;
      determine a predicted geometry of the hydraulic fracture based on properties of the fracking fluid using a fracture model;
      determine an uncertainty value of the observed geometry based on the predicted geometry; and
      update the fracture model using the information about the microseismic event in response to determining that the uncertainty value of the observed geometry is less than or equal to a pre-set maximum; and
   wherein the code is executable for causing the computing device to:
      store the observed geometry and a classification of the observed geometry in a data store, the classification indicating if the uncertainty value associated with the observed geometry exceeds the pre-set maximum;
      determine a cluster of observed geometries that represent a growth of the hydraulic fracture; and
      calibrate the fracture model using the cluster of observed geometries.

8. The system of claim 7, wherein the code is executable for causing the computing device to:
   generate a visual representation of the hydraulic fracture based on the fracture model.

9. The system of claim 7, wherein the properties of the fracking fluid include at least one of an injection rate of the fracking fluid and a viscosity of the fracking fluid.

10. The system of claim 7, wherein the observed geometry is an observed length of the hydraulic fracture and the predicted geometry is a predicted length of the hydraulic fracture.

11. The system of claim 7, wherein the at least one sensor is positionable within a wellbore.

12. The system of claim 7, wherein the at least one sensor is positionable at a surface of the subterranean formation.

13. A system comprising:
   at least one sensor for transmitting information about a microseismic event in a subterranean formation, the information about the microseismic event being transmitted subsequent to a fracking fluid being introduced into the subterranean formation; and
   a computing device for:
      determining an observed geometry of a hydraulic fracture based on the information about the microseismic event, a predicted geometry of the hydraulic fracture based on properties of the fracking fluid and a fracture model, and an uncertainty value of the observed geometry based on the predicted geometry; and
      updating the fracture model using the information about the microseismic event in response to determining that the uncertainty value of the observed geometry is less than or equal to a pre-set maximum; and
      storing the observed geometry and a classification of the observed geometry in a data store, the classification indicating if the uncertainty value associated with the observed geometry exceeds the pre-set maximum;

determining a cluster of observed geometries that represent a growth of the hydraulic fracture; and calibrating the fracture model using the cluster of observed geometries.

14. The system of claim 13, the computing device also for:

generating visual representation of the hydraulic fracture based on the fracture model.

15. The system of claim 13, wherein the observed geometry is an observed length of the hydraulic fracture and the predicted geometry is a predicted length of the hydraulic fracture.

16. The system of claim 13, wherein the at least one sensor is a tiltmeter.

17. The system of claim 13, wherein the at least one sensor is a geophone.

\* \* \* \* \*